United States Patent

[11] 3,621,864

| [72] | Inventors | Hiroshi Tonegawa<br>Kawagoe-shi;<br>Tadayuki Kawasaki, Higashi-Matsuyama-shi; Kenji Nakayama, Higashi-Matsuyama-shi, all of Japan |
|---|---|---|
| [21] | Appl. No. | 839,399 |
| [22] | Filed | July 7, 1969 |
| [45] | Patented | Nov. 23, 1971 |
| [73] | Assignee | Diesel Kiki Kabushiki Kaisha<br>Tokyo, Japan |
| [32] | Priorities | June 5, 1969 |
| [33] | | Japan |
| [31] | | 44/43576;<br>July 10, 1968, Japan, No. 43/47798 |

[54] ELECTRICITY-FLUID PRESSURE CONVERTER
1 Claim, 7 Drawing Figs.

[52] U.S. Cl...................................................... 137/83,
137/85, 251/129
[51] Int. Cl...................................................... G05d 16/00,
F15b 5/00

[50] Field of Search............................................ 137/83,
81.5; 91/3; 251/129

[56] References Cited
UNITED STATES PATENTS

| 2,759,532 | 8/1956 | Harris............................ | 91/3 X |
| 3,099,280 | 7/1963 | Holzbook...................... | 137/83 |
| 3,362,423 | 1/1968 | Sivinehart..................... | 137/83 |
| 3,452,769 | 7/1969 | Jones............................ | 137/81.5 |

*Primary Examiner*—Alan Cohan
*Attorney*—Larson, Taylor & Hinds

ABSTRACT: Electricity fluid pressure converter comprising nozzles disposed in opposite at a distance coaxially, one of which is a delivery nozzle and the other a receiving nozzle having a pressure receiving port of a delivered fluid with its opposite side being an output side, and a shield plate provided in the middle of said nozzles, said plate being displaced to a direction at right angles to the nozzle axes thus varying distribution of the jet speed to change the pressure generated in the pressure receiving nozzle.

FIG. 1
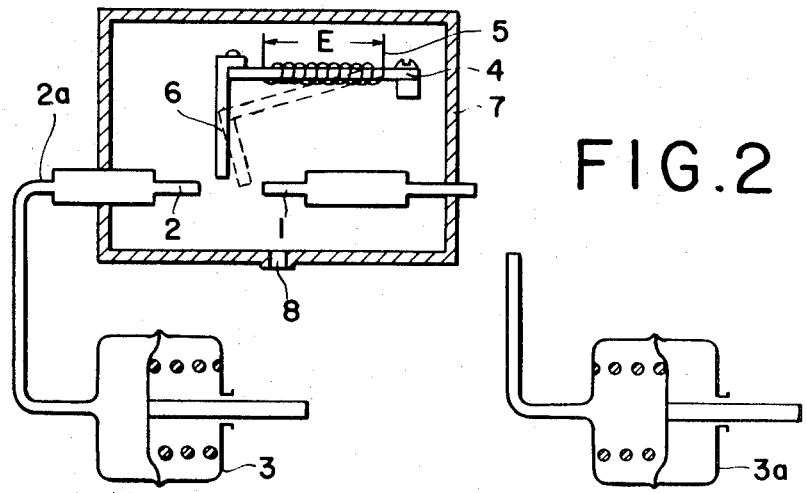
FIG. 2
FIG. 3
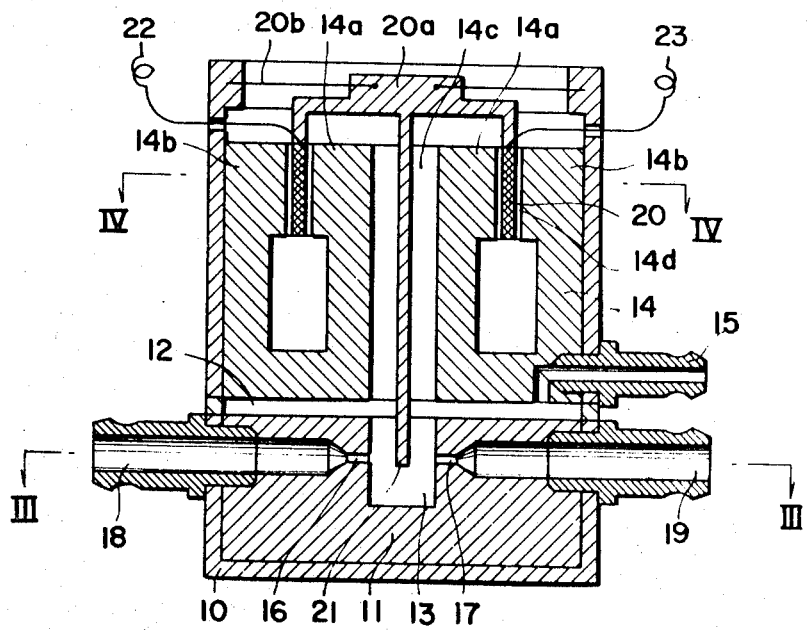

ELECTRICITY-FLUID PRESSURE CONVERTER

This invention relates to an electricity-fluid pressure converter of a novel construction used for remote controlling a variety of machines and equipments and the like.

In the conventional converters of the kind, for example in one of the converters, which the area of air flow passage is normally variable by adjustment of opening of a valve in a single-airflow passage by controlling the electromagnetic force of the force motor, the device is much complicated in structure, high in cost and further involves drawbacks such as undesired effect of inertia and friction in the parts of mechanical movement of the converter. Another type of the force motor system, in place of a valve, contemplated provision of an air jet nozzle connected to an air chamber in which a rated air pressure is delivered and a flat plate in the vicinity of a port of the nozzle to thereby control said electromagnetic force for displacement of the flat plate in the axial direction of the nozzle and to obtain pressure variation in the air chamber as an output. The system as described above was not capable of securing a stable performance because the end surface of the nozzle and the surface of the flat plate and their parallel arrangement exerted a great influence on the output as the interspace between the nozzle and the flat plate was small. Prevention of these shortages requires a high accurate precision in the manufacture and a skill for assemblage of parts of the device and there is limit to be used for industrial purpose. There has also been proposed an ejection tube system in use of a torque motor which is designated to vary the direction of an ejection nozzle relative to a pressure receiving part by electromagnetic force but the system involves undesired problems in the construction a fulcrum on the movable nozzle and in processing and maintenance of sliding parts.

The present invention is to provide an electricity fluid pressure converter which comprises a pair of nozzles disposed in opposite and spaced apart a distance and having their axis centers in alignment, one of which is a delivery nozzle for fluid and the other of which is a receiving nozzle having a pressure receiving port of a delivered fluid with its opposite side being an output side, a shield plate being provided in the middle of said nozzles, wherein said shield plate is displaced to a direction at right angles to the axes of the nozzles thus varying the distribution of speed of a fluid jet from the delivery nozzle or the momentum of movement so as to change the pressure generated in the pressure receiving nozzle.

The object of the invention with such construction as described is to obtain an electricity fluid pressure converter which will comply with the following requirements:

1. Distance between a shield plate and nozzles may be relatively large.
2. The shield plate has a larger freedom for the axial position of the nozzles. Precision is not required so much for parallel positions of the shield plate and the nozzles in the direction of movement. Coarseness of opposite surfaces have less influence in roughness. Therefore the device is easy for manufacture and stable in performance.
3. The shield plate can be used in a pressure responsive part operated either by positive or negative pressures.
4. Displacement of the shield plate is available by any of the linear or rotary movements.
5. Operation of the shield plate is possible by electromagnetic force corresponding to the input electric signals.
6. Movement of the shield plate is performed in accordance with deformation of a bimetal by electric heating corresponding in input electric signals.

The invention will now be illustrated in more detail with reference to an embodiment shown in the accompanying drawings:

FIG. 1 is a diagrammatic view in cross section of an embodiment where an electricity fluid pressure converter of the invention is operated by use of a bimetal;

FIG. 2 is a diagrammatic view of a modification of a part in FIG. 1;

FIGS. 3, 4 and 5 are cross sectional views of an embodiment of the electricity fluid pressure converter which is operated by use of electromagnetic force;

Figure 4:
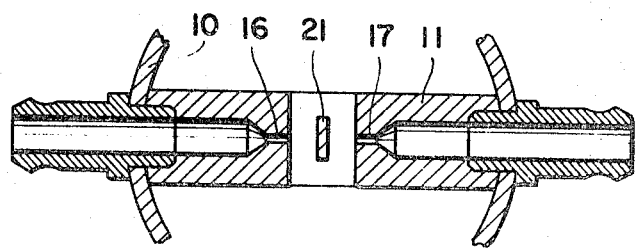
Figure 5:
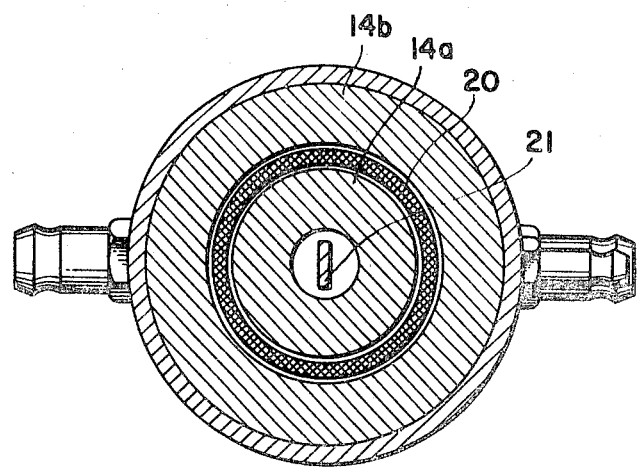

Referring now to FIG. 1, there is shown a device of the invention in cross-sectional view which is used for application of pressurized air to a fluid and operated by conversion of electric signals into an amount of electric heat. A pressure receiving nozzle 2 is provided in a casing 7 in opposite to the air delivery nozzle on the dame axial line. The opposite side of the air delivery nozzle 1 is passed to the outside of the casing and is connected to a pressure feeding source not shown. Outlet port on the opposite side of the pressure receiving nozzle 2 is connected either to a pressure chamber of the pressure responsive operator part 3 having for use, a piston or diaphragm as shown in the drawings or to an input port of a known fluid amplifier for amplifying said signals at the outside of the casing 7. The casing 7 passes through the air port 8 to the atmosphere. On the outer periphery and in the vicinity of said bimetal 4 is provided an electrically resistant heating element 5 which is heated on application of an input signal voltage E. At the movable end of the bimetal 4, one end of which is fixed is provided a shield plate 6 in rigid fixing for sheltering a part of an air passage connected from the delivery nozzle 1 to the pressure receiving nozzle 2 in a direction substantially perpendicular to the passage or to the axes of the nozzles. The air is constant pressure ejected from the delivery nozzle runs in free jet, expands itself and disperses in sensing the flow speed, a part of which air jet is obstructed by the forward end of the shield plate 6 on the way and the other part collides with the pressure receiving port of the nozzle 2 whereby the speed energy is converted to the pressure energy. The bimetal 4 is curved downwardly on the surface as seen in the figure in proportion to the input signal voltage E of the heating element 5. The shield plate 6 moves with the bimetal and is displaced to the direction at right angle to the nozzle axis shown by broken line on the figure so that the air jet between the delivery and the pressure receiving nozzles 1 and 2 is varied in the effective area of passage and variation of the amount of air jet which has reached the pressure receiving nozzle or the conversion amount to speed energy in the pressure receiving nozzle 2 will vary. This causes occurrence of pressure variation at the outlet port 2a relative to variation of voltage E thereby effecting desired electricity air pressure conversion.

With respect to the second embodiment in which the device is operated by negative pressure in connection with the responsive operator part 3a the first embodiment may be modified as follows. In the second embodiment the airport 8 of the casing 7 is connected to a negative pressure source of a predetermined pressure not shown and a port passing to the outside of the casing on the opposite side of the delivery nozzle 1 is opened to the atmosphere through air filter not shown. The output port 2a of the pressure receiving nozzle 2 is connected to the negative pressure chamber of the operator part 3a or to the inlet port of a fluid amplifier in the subsequent stage. The air jet between the nozzles is generated by the pressure difference of the atmospheric pressure of the delivery nozzle and the negative pressure in the casing so that as in the first embodiment there may be obtained a pressure variation for the pressure receiving nozzle 2 corresponding to the variation of a voltage E applied on the heating element 5 whereby the conversion of electricity to air pressure is accomplished. In these embodiments, when the effect of peripheral temperature may be intended to be removed it can be done simply by a method such as using an auxiliary bimetal for the compensation of the peripheral temperature. It is apparent that a fluid other than gas may be used to obtain the similar effect by thermally insulating the bimetal from liquid in known manner.

The third embodiment of electricity fluid pressure converter using for example force motor in which the electric signals are converted into electromagnetic force is described.

In FIG. 3, on the bottom of a cylindrical casing 10 a similar shape main body 11 and a permanent magnet 14 are housed having a space between the main body 11 and the permanent magnet 14. The main body 11 has a chamber 13 in the middle thereof. The permanent magnet 14 has poles 14a and 14b respectively formed in an inner wheel and an outer wheel thus forming a passage port 14c coaxial with the chamber 13 and an annular groove 14d having a bottom coaxial with said port 14c and being circular in shape. The space 12 connects the chamber 13 to the outside through the port 15 on the wall of the casing 10. A fluid delivery nozzle 16 and a fluid pressure receiving nozzle 17 opposite to and coaxial with each other are opened into the chamber 13. A fluid of a predetermined pressure is delivered through a delivery port 18 from a fluid feeding source not shown in the opposite side of the fluid delivery nozzle 16. The opposite side of the fluid pressure receiving nozzle 17 is connected to the responsive operator part 3 of fluid pressure same as that shown in FIG. 1 through an outlet port 19. In the annular groove 14d between said two magnetic poles is suspended a cylindrical coil 20 by a support member 20a without contacting the magnetic poles. A shield plate 21 connected to the center of the support member 20a is suspended in the middle and perpendicular to the axes of the nozzles 16 and 17 through the bore 14c of the permanent magnet. The support member 20a is overhung by a sheet spring 20b fixed on the outer walls of the casing to move resiliently upwardly and downwardly retaining the above-mentioned position. The movable coil 20 is applied a voltage as electric signal which is continuously variable by leads 22 and 23. When the leads 22 and 23 are applied a voltage as permanent magnet an electric current flows to the movable coil 20 and there a repulsive force is generated in the axial direction between said current and the magnetic force of the permanent magnet 14. After the movable coil 20 and the connected shield plate 21 are displaced upwardly as in FIG. 3, they are balanced in position by a spring 20b. The shield plate 21 is displaced in proportion to the input voltage applied thereon. The free jet of fluid for example air current supplied to the fluid delivery nozzle 16, expands itself in width and is dispersed in reducing its flow speed. Part of said jet air is interrupted by the forward end of the shield plate 21 and the other part collides with the pressure receiving nozzle 17 causing the speed energy to convert into the pressure energy. It is as well possible to operate the described pressure responsive operator part similarly as in the above described first embodiment.

Throughout the above embodiments the description mainly comprised the delivery of pressurized air to the fluid delivery nozzle 16. However it may also be able to maintain the chamber 13 under a determined negative pressure with the port 15 being connected to the feeding source of a determined negative pressure to introduce the atmosphere to the air delivery nozzle 16 and connect the outlet port 19 of the pressure receiving nozzle 17 to the operator part responsive to the negative pressure as in the second embodiment. It is to be understood that the fluid for generating a jet air current may either be a gas or a liquid other than the air which will obtain an equivalent effect in the operation for attaining the same object.

In this embodiment the force motor is operated by electric signals, allowing the shield plate to effect a linear movement while the rotary movable coil or torque motor may be operated by electric signals in order to rotate the shield plate and thereby control the effective area of passage of the above described free air jet current. Otherwise the bimetal 4 of the first embodiment may be modified in a spiral form and attached to the rotary shaft 34 as in a fourth embodiment as described later to serve for the spring 36 whereby the rotation of the shield plate may equally be realized by deformation of the bimetal.

Figure 6:
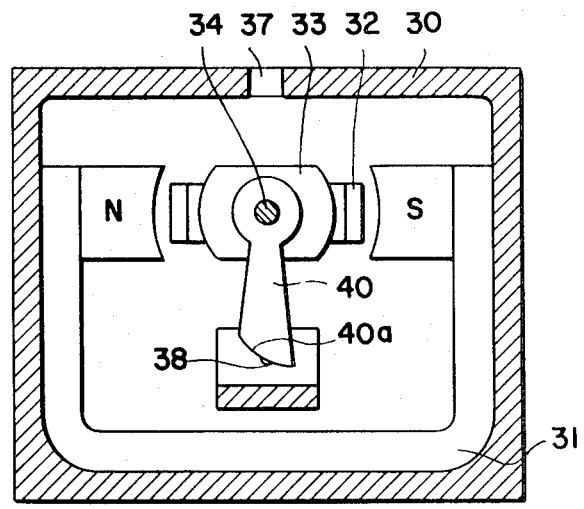
FIGS. 6 and 7 are cross sectional views of an embodiment where the electricity fluid pressure converter is operated by use of a rotary movable coil.
Figure 7:
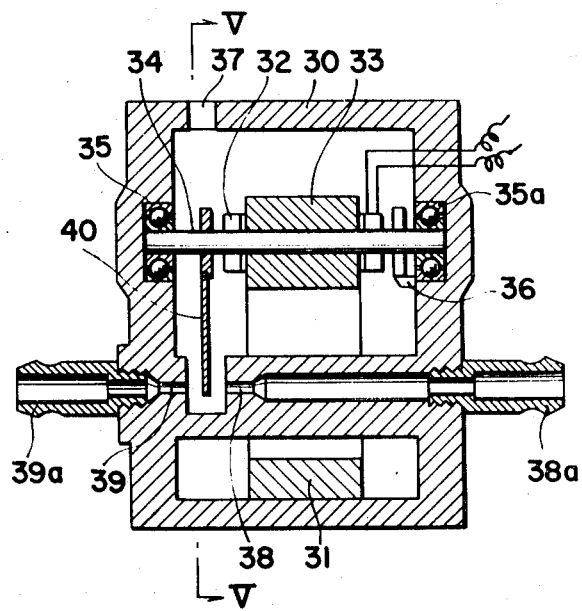

In FIGS. 6 and 7 the fourth embodiment according to the rotary movable coil system is now described. A permanent magnet 31 of horseshoe shape is attached in the enclosed casing 30 of a nonmagnetic material. Between the magnetic poles of said permanent magnet 31 there is supported as a core a movable coil 32 with a cylindrical nonmagnetic core 33 and the ends of the rotary coil shaft 34 passing through the coil in the radial direction together with the nonmagnetic body are supported on bearing 35 and 35a in the casing 30. On the bearing (35a) of the rotary shaft 34 is provided a wire 36 the outer end thereof being connected to the casing 30. The described construction is the same construction as the known voltmeter of the rotary movable coil type. The inside of the casing 30 is opened through a port 37 to the atmosphere. There are provided an air delivery nozzle 38 and an air pressure receiving nozzle 39 coaxially provided in opposite to each other and in parallel to said rotary shaft 34 of the coil. Air of a determined pressure is led from an air-feed source not shown to a pipe joint 38a on the opposite side of the air delivery nozzle 38. To the air pressure receiving nozzle 39 is connected the above-mentioned air pressure responsive operator part 3 through the pipe joint 39a. A shield plate 40 is attached to the bearing 35 side of the rotary shaft 34 and suspended in the middle of nozzles 38 and 39 at right angle to the axes of the nozzles. The outer periphery 40a of the shield plate 40 consists of a curve such as of a spiral curve the distance from the center of the rotary shaft of which gradually increases or decreases in the rotary direction.

By applying electric signals to the movable coil 32 the movable coil 32 turns clockwise in FIG. 6 against the force of the wire spring 36 in proportion to the input voltage by application of electric signals. Accordingly an edge 40a of the shield plate 40 can vary the effective area of passage of the free jet current of air generated between the nozzles 38 and 39. Similar to the embodiment 3 the casing 30 may be connected to the feeding source of a determined negative pressure through the port 37 to introduce the atmosphere to the air delivery nozzle 38 thereby to operate the negative pressure responsive part. The same effect can be obtained also by use of gas or liquid other than air.

Thus the invention affords rather less variation of pressure in the pressure receiving nozzle relative to the displacement of the shield plate in the axial direction of the delivery nozzle and the pressure receiving nozzle. Therefore the interspace between those nozzles may be considerably larger (for example five times the nozzle diameter) which would give much larger freedom of insertion for the shield plate and thereby solve the problem as encountered in the conventional similar mechanism which is required precision of manufacture and assemblage. It is not specially needed to provide a mechanical sliding or contacting member to ensure stable operation and endurable construction of the device.

We claim:

1. An electrically controlled pressure control device comprising a fluid delivery nozzle, a fluid pressure receiving nozzle spaced from and coaxial with said fluid delivery nozzle, a fluid pressure feeding means in communication with said fluid delivery nozzle, a fluid pressure responsive operator member in communication with said fluid pressure receiving nozzle, a movable shield plate disposed between said fluid delivery nozzle and said pressure receiving nozzle at right angles to the axis of said nozzles, said shield plate comprising an elongate blade member having a free end disposed in the space between said nozzles and having a plane surface facing said fluid delivery nozzle normal to the axis of said fluid delivery nozzle, and electromagnetic control means for controlling displacement of said shield plate, responsive to electrical input signals, in a direction at right angles to the axes of said nozzles so as to vary the effective area of passage between said nozzles for a free fluid jet generated by a pressure difference between the fluid delivery nozzle and the fluid pressure receiving nozzle, said electromagnetic control means comprising a permanent magnet including a central aperture through which said elongate blade member extends and an annular slot, a movable coil disposed in said annular slot in said permanent magnet, a coil support member for mounting said coil, said elongate blade member extending outwardly from said coil support member and being formed integrally therewith, and leaf spring means for resiliently supporting said coil support member relative to said permanent magnet.

* * * * *